April 8, 1969

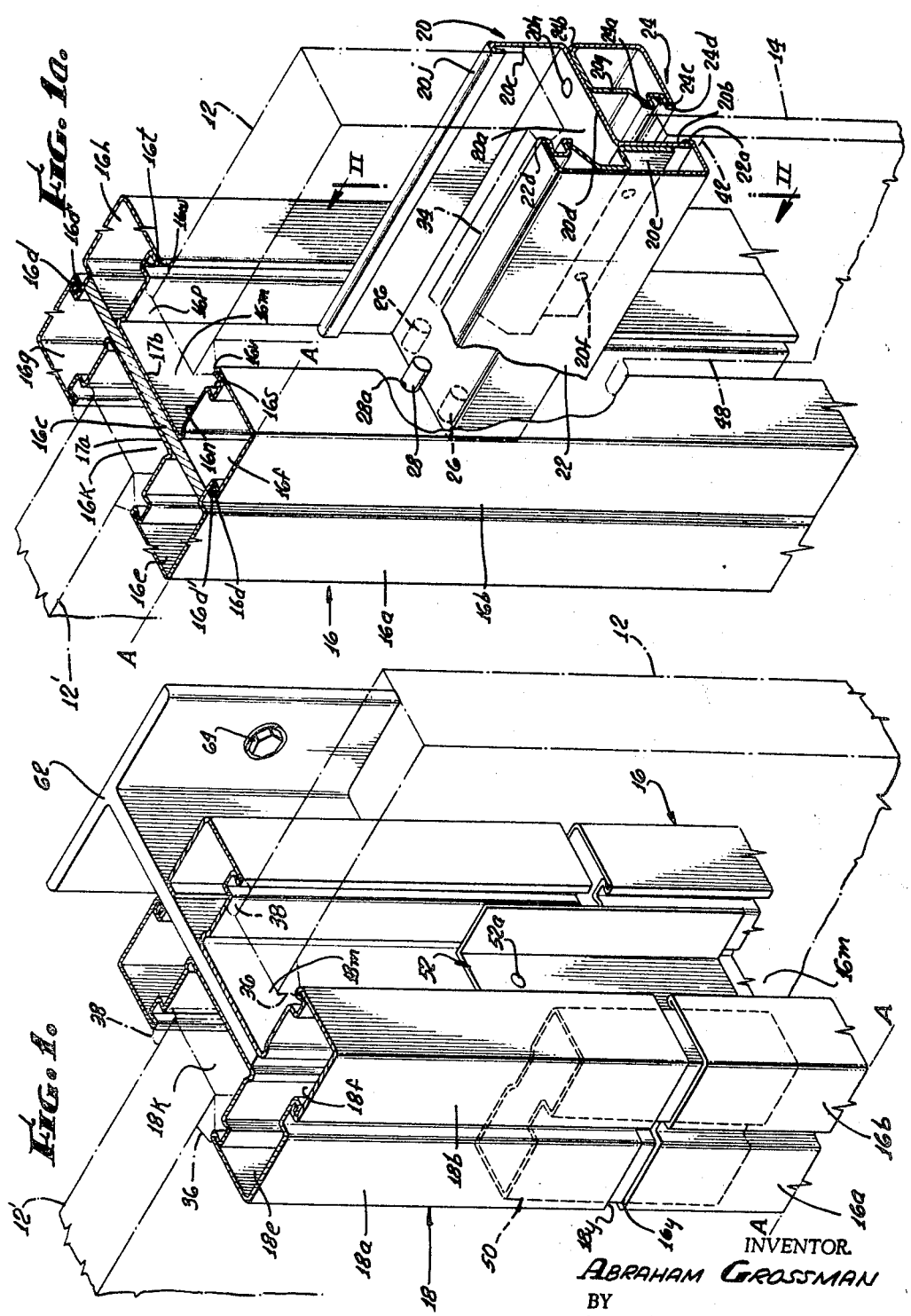

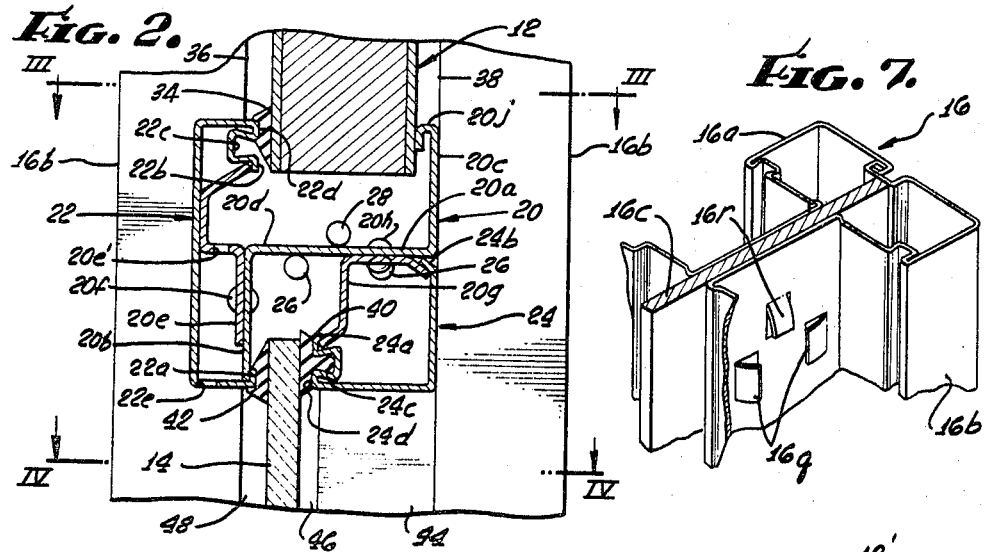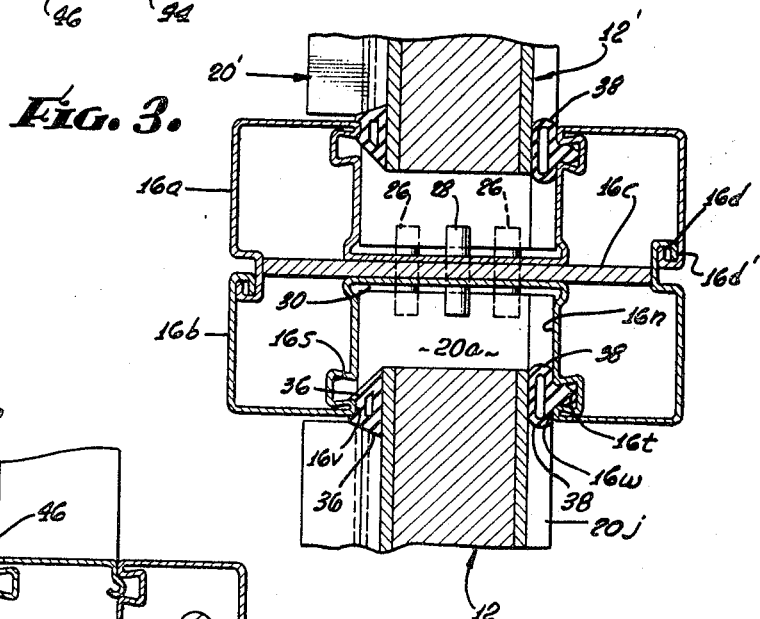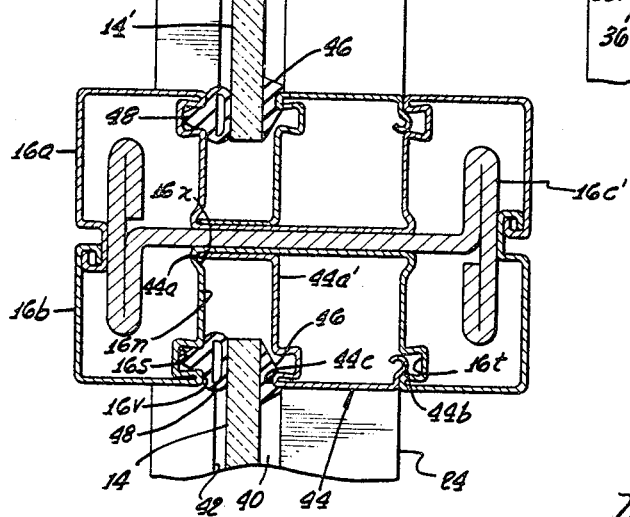

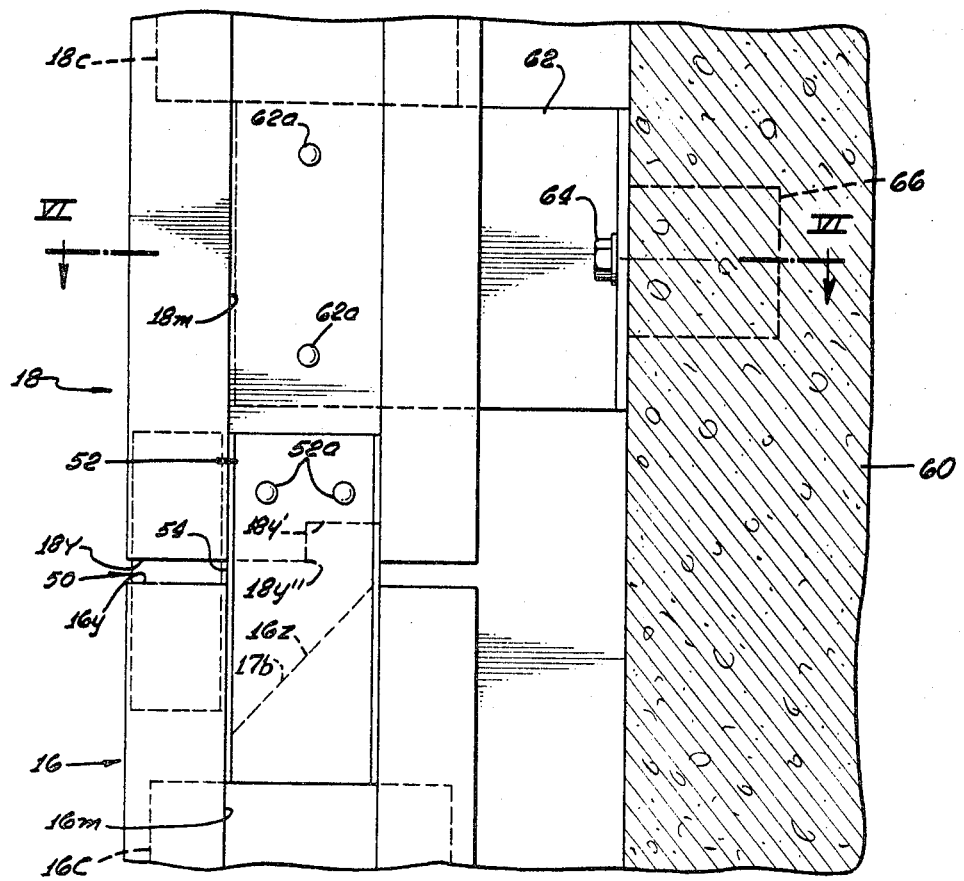
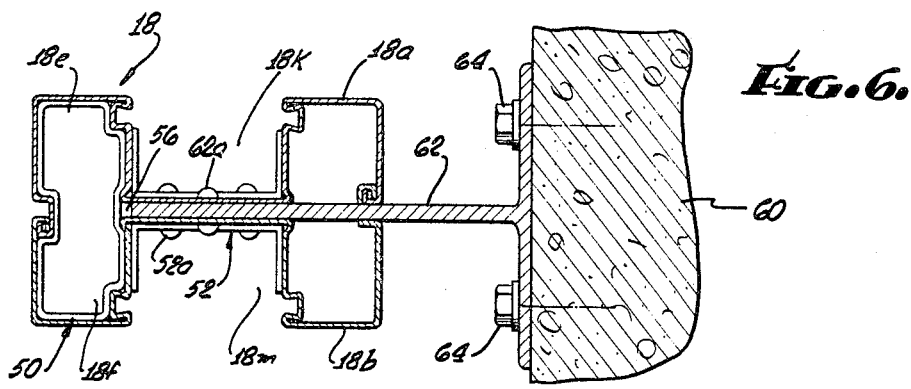

A. GROSSMAN 3,436,887

CURTAIN WALL CONSTRUCTION

Filed Oct. 18, 1967

INVENTOR.
ABRAHAM GROSSMAN
By
Miketta, Glenny, Poms & Smith
ATTORNEYS.

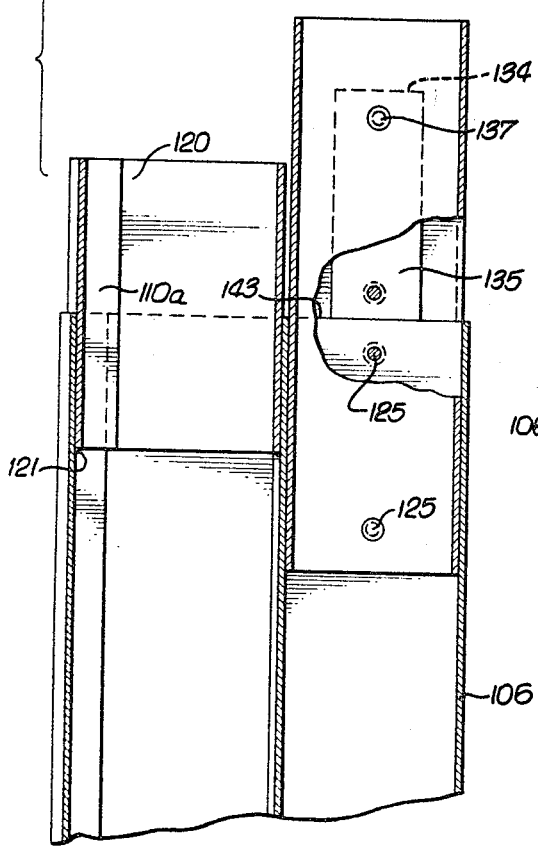
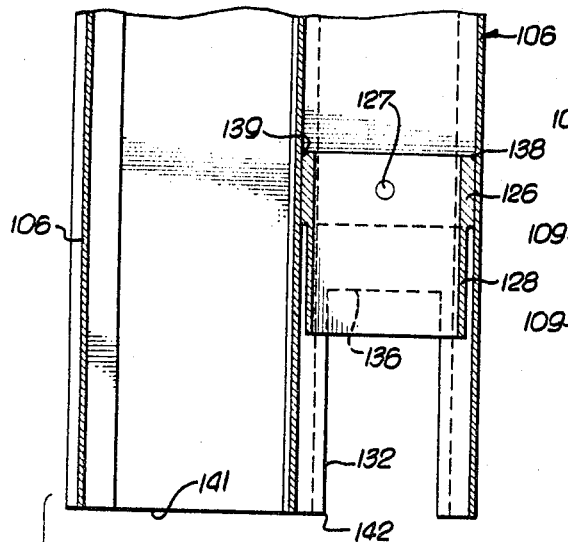
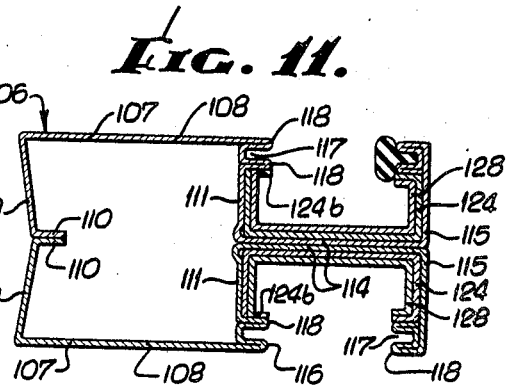
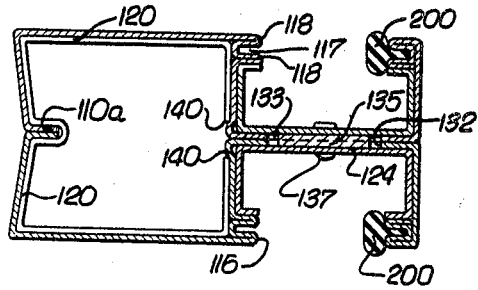
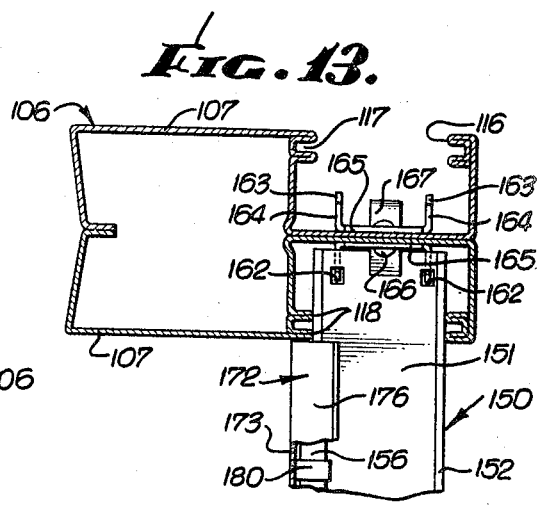

April 8, 1969 A. GROSSMAN 3,436,887
CURTAIN WALL CONSTRUCTION
Filed Oct. 18, 1967 Sheet 6 of 7
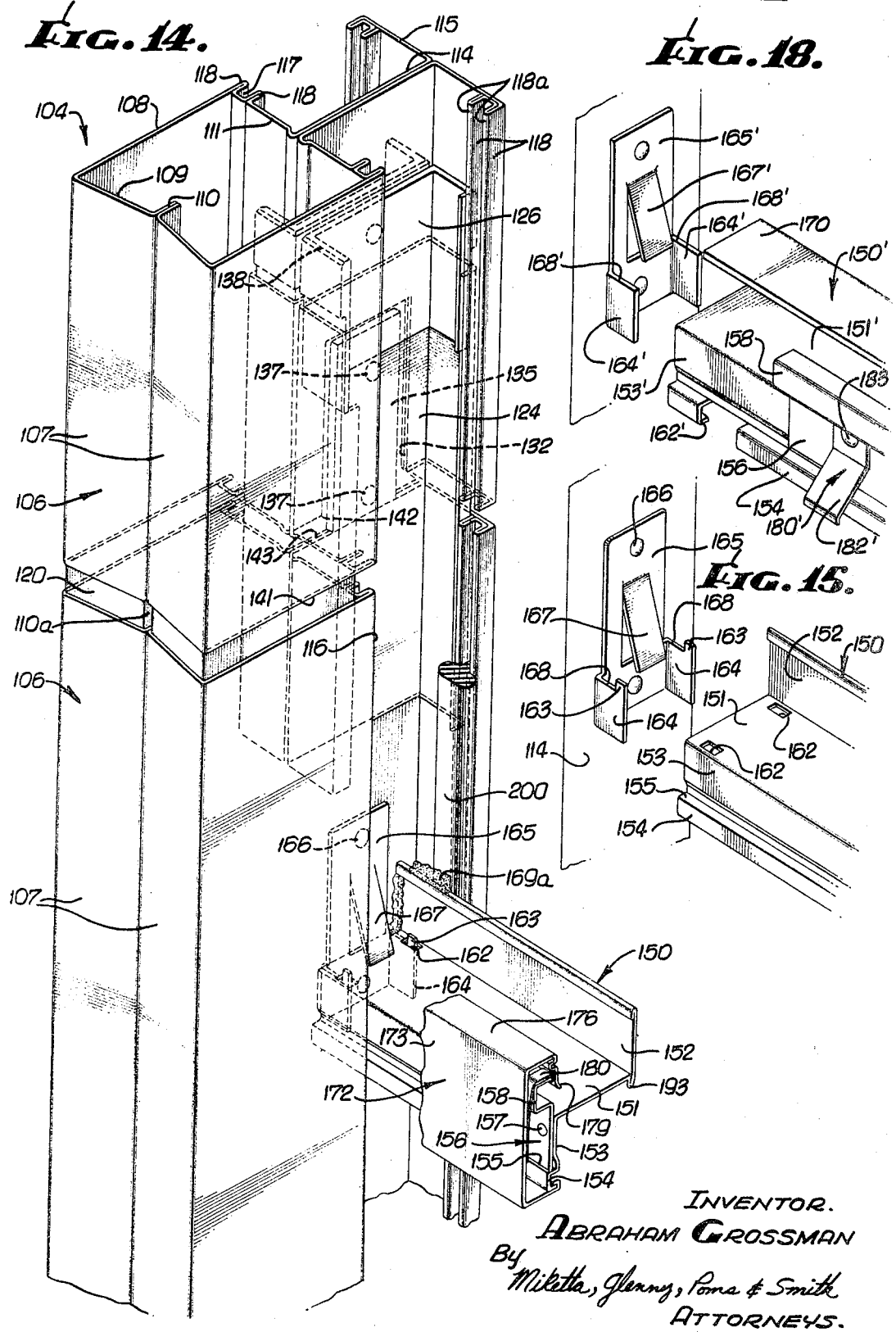
INVENTOR.
ABRAHAM GROSSMAN
By Miketta, Glenny, Poms & Smith
ATTORNEYS.

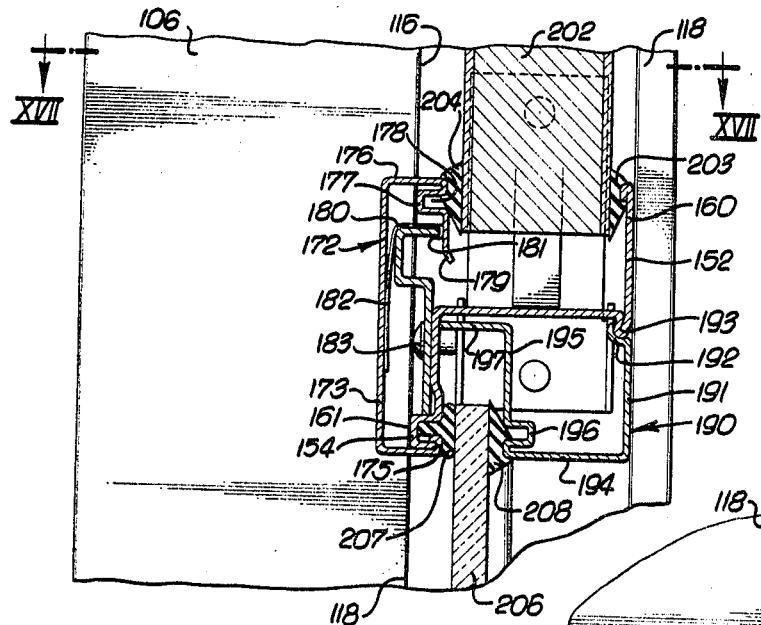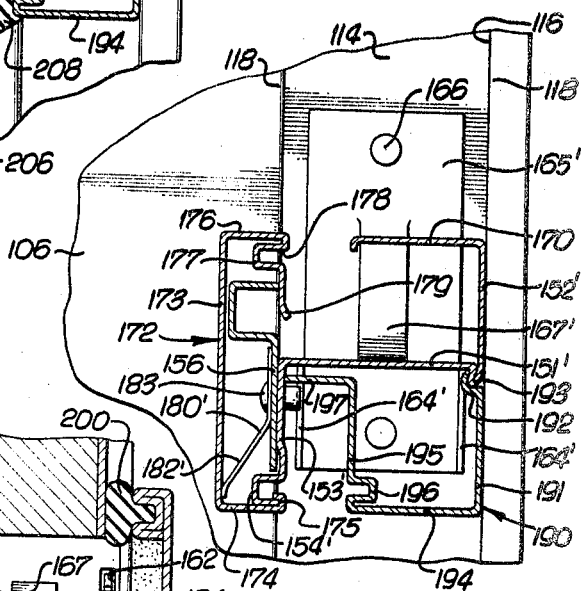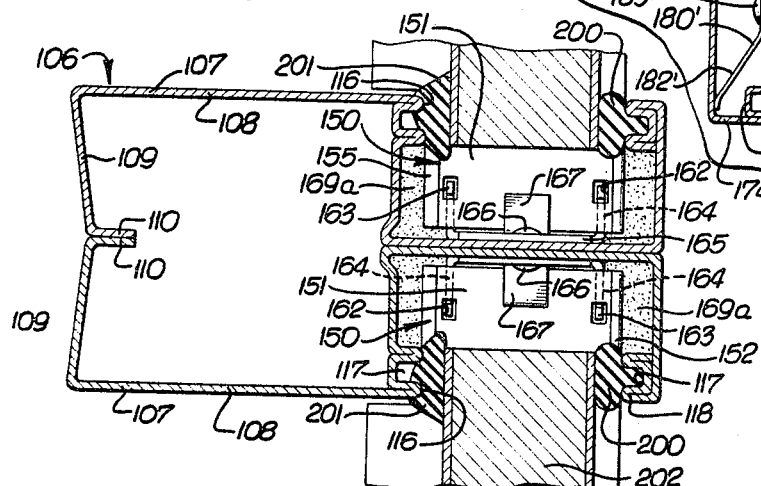

United States Patent Office

3,436,887
Patented Apr. 8, 1969

3,436,887
CURTAIN WALL CONSTRUCTION
Abraham Grossman, 9339 Rhea,
Northridge, Calif. 91325
Continuation-in-part of application Ser. No. 336,824,
Jan. 9, 1964. This application Oct. 18, 1967, Ser.
No. 676,240
Int. Cl. E04c 2/40
U.S. Cl. 52—235                      7 Claims

ABSTRACT OF THE DISCLOSURE

A curtain wall construction including vertical mullions anchored to a building structure and horizontal members supported from the mullions and readily assembled therewith in interlocking fashion and for permitting expansion and contraction of the horizontal members. Vertical mullions are coupled or spliced together by telescopic sleeve means to provide a weatherproof and water barrier construction. Curtain wall panels are held in assembly by separable molding clip means associated with the vertical mullions and horizontal members and by external retainer means carried by the horizontal members under resilient pressure.

---

The present application is a continuation-in-part application of Ser. No. 336,824, filed Jan. 9, 1964, and now Patent No. 3,357,145, entitled, Curtain Wall Construction Allowing Vertical and Horizontal Expansion.

Background of the invention

In the building industry today, the use of curtain wall construction for use in single as well as multistory structures is desirable for economy, simplicity, appearance and ease of assembly. Curtain walls enable architects to utilize both fixed glass and/or operable sash on the exterior of the building at economical costs.

The frame members of curtain walls in use today are primarily made of aluminum. However, stainless steel is both desirable and in some respects will afford a better construction. It has been difficult, if not impossible, to use stainless steel in frames for curtain walls due to the difficulty of fabrication in the shop or assembly on the job. The present invention completely obviates this problem. Moreover, in prior proposed curtain wall constructions during assembly of the curtain wall on the structural steel framing, horizontal and vertical members of such curtain wall constructions required interconnecting such prior proposed horizontal and vertical members by bolting, riveting or other hardware attached to either or both of such members. Installation of such prior proposed curtain wall assemblies involved high labor costs. In such prior curtain wall constructions, mullion joints permitted leakage of water through the curtain wall by traveling of the water along the bottom ends of the mullions either by a driving wind or capillary action.

Summary of invention

The present invention contemplates a curtain wall construction provided with features and advantages as described in original application Ser. No. 336,824 and embodied in modified constructions of the mullion and horizontal member interconnection, the water barrier mullion joint or coupling and the construction of said mullions and horizontal members with respect to fenestration framing.

It is, therefore, an object of the present invention to provide an improved curtain wall construction which can be easily and quickly assembled, structurally acceptable in the trade, and which will provide for expansion and contraction of the curtain wall frame without setting up undue stress in the members thereof while providing water-tight integrity.

A further object of the present invention is to provide an improved connection for joining horizontal members to a vertical mullion in a curtain wall construction in a quick and easy manner.

A still further object of the invention is to provide an improved novel means of coupling or splicing adjacent mullion ends within a curtain wall construction to prevent leakage of water from the exterior of the curtain wall toward and to the interior of the curtain wall.

A still further object of the invention is to provide an improved structural readily assembled mullion joint means.

Specific objects of the present invention are to disclose and provide a curtain wall construction in which the cross-sectional configuration of the vertical mullions and the horizontal members interconnected therewith cooperate in an improved manner so that assembly of the curtain construction is facilitated, expansion and contraction of horizontal members and vertical mullions is more readily permitted while maintaining water-tight integrity and proper support of curtain wall panels, the provision of a horizontal member including a retainer member adapted to be readily clipped into assembly with the horizontal member and maintained in nonrattling assembly therewith by resilient spring biased pressure, the provision of an internal panel retainer member readily engageable with a horizontal member and a panel whereby panels may be disassembled and assembled in the curtain wall construction from the interior of the building structure if desired, and the provision of an improved means for releasably interconnecting the horizontal member with the vertical mullion.

Other objects and advantages of the present invention will be readily apparent from the following description of the drawings in which exemplary embodiments of the invention are shown.

Description of the drawings

FIGS. 1 and 1a show an isometric view, with elements broken away, of an exemplary construction of the curtain wall of the present invention. FIG. 1 illustrates the upper half of such construction and FIG. 1a shows the lower half thereof, the two figures being broken along a transverse plan A—A. An upper solid wall panel and lower glass panel are shown in phantom for clarity.

FIG. 2 is a vertical cross-section taken along plane II—II of FIG. 1a, the solid wall panel and glass wall panel being shown in full.

FIG. 3 is a horizontal section taken along plane III—III of FIG. 2.

FIG. 4 is a horizontal section taken along plane IV—IV of FIG. 2.

FIG. 5 is a side elevation of adjacent mullions joined within a vertical column with the panels removed, and illustrates an exemplary water-right connection.

FIG. 6 is a horizontal section taken along plane VI—VI of FIG. 5.

FIG. 7 is an isometric view of another embodiment of the connection means for the end of the horizontal channel to the vertical mullion.

FIG. 10 is a fragmentary exploded vertical sectional view of a mullion joint show in FIG. 8.

FIG. 11 is a transverse sectional view taken in the plane indicated by line XI—XI of FIG. 8.

FIG. 12 is a transverse sectional view taken in the plane indicated by line XII—XII of FIG. 8.

FIG. 13 is a transverse sectional view taken in the plane indicated by line XIII—XIII of FIG. 8.

FIG. 14 is an enlarged fragmentary perspective view of a mullion joint connection and a horizontal member connection embodying the invention.

FIG. 15 is a fragmentary exploded perspective view illustrating the connection of the horizontal member to the mullion.

FIG. 16 is a fragmentary vertical sectional view of a horizontal member embodying this invention, the section being taken in a vertical plane spaced from the vertical mullions.

FIG. 17 is a fragmentary transverse sectional view taken in the plane indicated by line XVII—XVII of FIG. 16.

FIG. 18 is a fragmentary perspective exploded view of a different embodiment of the releasable connection of the horizontal member to the vertical mullion.

FIG. 19 is a vertical sectional view taken through a horizontal member embodying the construction shown in FIG. 18.

Referring now to FIGS. 1–7 inclusive of the drawings, wherein like reference numerals designate like or corresponding parts, an exemplary curtain wall construction (FIGS. 1 and 1a) may include a solid curtain wall panel 12 (in phantom) and a glass wall panel 14 (in phantom) supported by curtain wall framing. Such framing includes laterally spaced vertical mullions each formed of adjoining mullion members 16 and 18 arranged in a column and vertically spaced horizontal channel members 20 which define a curtain wall opening.

As shown in FIG. 1a, the mullion 16 may have a pair of channel shaped members 16a and 16b which are maintained in spaced relationship by a vertical reinforcing sheet 16c and which are interlocked by inturned and interengaging edges 16d and 16d' provided on front and rear sides of members 16a and 16b, respectively.

Figures 8, 9:
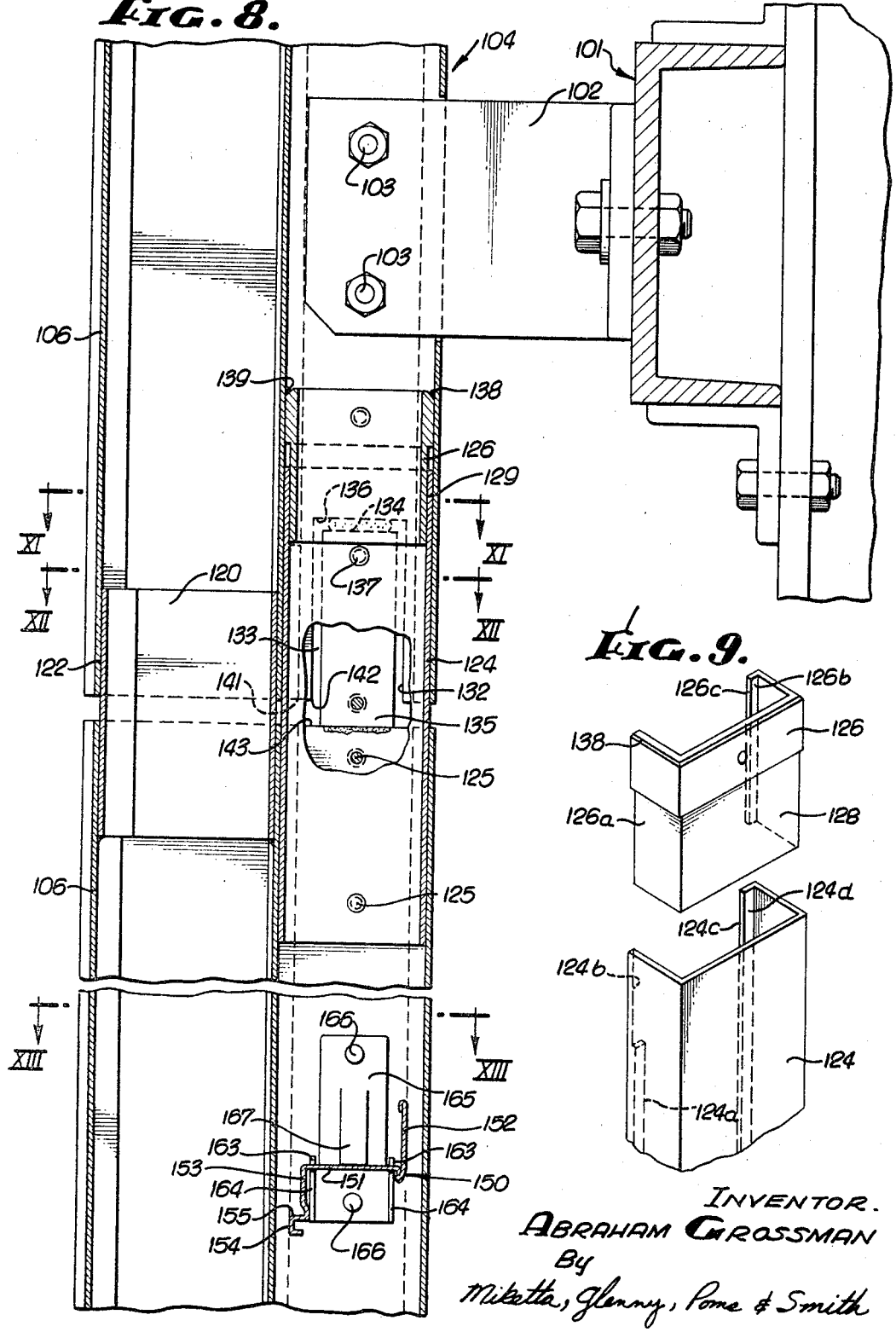
FIG. 8 is a fragmentary vertical sectional view of a mullion joint showing a different embodiment of the invention, the section being taken in a vertical plane passing through one of the mullion parts from front to rear.
FIG. 9 is a fragmentary perspective view of mullion coupling elements shown in FIG. 8.

The configuration of the mullion members 16a and 16b together with sheet 16c provide forward hollow spaces 16e and 16f and rear hollow spaces 16g and 16h. The vertical channel-like members 16a and 16b include web portions 17a, 17b, respectively and said members are arranged in back to back relation to provide vertically extending side recesses or channels 16k and 16m, respectively, such recesses or channels being adapted to receive vertical wall panels such as solid panels 12' and 12 and glass panels 14' (shown in FIG. 4) and 14. The mullion 18 and the other mullions in the curtain wall frame may be similarly constructed.

The end portion of a horizontal channel member 20 is adapted to be received in the vertically extending recess 16m of the mullion 16 when the frame members are being assembled, such horizontal member 20 being retained within such mullion 16 by supporting and connecting means which will be described in detail hereinafter.

An exemplary horizontal member 20 of this invention may be constructed of a plurality of elements rigidly connected together, such as a main horizontal member 20a having a downwardly extending front flange 20b and an upwardly extending rear flange 20c, such flanges being interconnected by a horizontal web 20d.

The horizontal member 20 may have an elongated clip 20e or a plurality of horizontally spaced clips 20e extending vertically above web 20d and connected to the front flange 20b by any suitable means such as rivets 20f, and may have another elongated clip 20g connected to the web 20d by any suitable means such as rivets, one rivet 20h being shown in FIG. 1a. The clips 20e and 20g are utilized for supporting panel retainers 22 and 24 to be discussed more fully hereinafter.

As shown in FIGS. 1a, 2 and 3, the end of the main horizontal channel member 20a is received within the side mullion recess 16m. The front flange 20b has a front side which may slidably engage a front side 16n of the recess 16m and the rear flange 20c has a rear side which may slidably engage a rear side 16p of the recess 16m so as to restrain the horizontal channel member 20 from forward or rearward movement with respect to the mullion 16.

Such vertical mullions 16 or 18 may be connected between their ends to the horizontal members 20 to prevent vertical movement therebetween by means for releasably connecting and for allowing expansion and contraction between such mullions and horizontal members. As shown in FIGS. 1a, 2 and 3, such means for connecting one end of a horizontal member to a vertical mullion 16 or 18 may include a pair of laterally spaced pins 26, each of which may slidably engage and support a bottom side of the web 20d, and a pin 28 which is spaced upwardly from pins 26 and which may slidably engage and retain a top side of the web 20d. The main channel member 20a has an end portion (not shown) opposite to that shown in FIG. 1a which may be connected in a similar manner to a mullion (not shown) in another adjacent column of the curtain wall framing.

The pins 26 support the weight at the end of the horizontal channel member 20 and the pin 28 restrains the channel member 20 from upward movement. The pins 26 may be fixed in position by a force fit through mullion members 16a and 16b and reinforcing sheet 16c and may extend into the other mullion recess 16k (as seen in FIG. 3) to support another horizontal channel member 20'.

After the horizontal member 20 is placed on top of and supported by pins 26, pin 28 is adapted to be forced through opening 28a which extends through mullion members 16a and 16b and reinforcing sheet 16c for restraining and preventing vertical movement of such horizontal member 20. Such pin 28 may extend into both adjacent recesses 16k and 16m (FIG. 3) to simultaneously and releasably restrain vertical movement of members 20 received in such recesses in the assembled position. Pin 28 may be removed in the event such members are disassembled or are replaced if damaged.

Such means also allows for expansion and contraction of such members 20 which may be of a length slightly less than the distance between adjacent columns of mullions 16 or 18 as measured from the bottoms of their recesses so that a space is provided between at least one of the channel ends and a respective mullion, such as space 30 shown in FIG. 3. Accordingly, when the main channel member 20a expands or contracts the channel web 20d will slide along the pins 26 and 28 and thereby not exert an undue stress within the curtain wall framing. It is understood that the length of that portion of pin 28 extending into recess 16m and supporting one end of member 20 will be of greater length than the space 30.

Such means may also include other embodiments, such as the embodiment for connecting the main horizontal channel member 20a to the mullion 16 as shown in FIG. 7. The mullion member 16b may include laterally spaced struck out portions 16q which support the channel 20 by slidably engaging the bottom side of the web 20d. Further, an upwardly spaced spring tab 16r may be struck out of the mullion member 16b and has sufficient resiliency to be forced inwardly toward the center of the mullion 16 so as to allow the end of the main channel member 20a to pass thereover and then snap across the top of the channel web 20d when the channel web 20d is forced past the tab and is supported on portions 16q.

The bottom end of the tab 16r is vertically spaced from the top of the struck out portions 16q so that when the end of the main channel member 20a is forced past the tab 16r, the tabs 16q will slidably engage the bottom side of the web 20d and the tab 16r will slidably engage the top of the web 20d. Accordingly, one end of the main channel member may be connected to another mullion (not shown) and then the opposite end snapped into a connected position with the mullion 16.

It is to be understood that elements separable from the vertical mullion may be substituted for the struck out portions 16q and 16r and may be attached to the mullion by any suitable means such as bolting or riveting.

Further, it is to be noted that both types of connections (FIGS. 1a and 7) allow quick disassembly of the channel member 20 should it be required. In disassembling the pin connection the pin 28 is driven flush with the bottom of the recess 16m and a similar pin is driven flush in a mullion in an adjacent column and then the channel member 20 is lifted from position. In the connecting means shown in FIG. 7 the same procedure is used only the tab 16r and a similar tab on a mullion in the adjacent column are biased inwardly until the channel member 20 can be lifted from position.

It can readily be seen that either type of connection allows the channel member 20 to be connected to the mullion 16 and another mullion in an adjacent column without altering the cross-section of the main channel member 20a. This simplifies construction of the main member 20a since no notching is required to make its connection with the vertical mullion.

Panels 12 and 14 are adapted to be retained on horizontal channel members 20 by elongated panel retainers 22 and 24 (FIGS. 1a and 2). The panel retainer 22 may be provided with a plurality of weep holes.

The panel retainer 22 may include vertically spaced inturned lower and upper edges 22a and 22b, the upper edge 22b interengaging the top edge of the clip 20e. The retainer 22 may be constructed of a material which is of a sufficient thinness so as to allow the retainer edge 22b to snap engage the top edge of the clip 20e when the retainer 22 has been positioned with its bottom edge 22a interengaging the bottom edge of the front flange 20b.

The panel retainer 24 may include an inturned lower edge 24a which interengages a front turned bottom edge of the clip 20g, and a turned upper edge 24b which interengages an upper turned edge of the clip 20g. The panel retainer 24 may be constructed similar to panel retainer 22 so that the retainer 24 may be assembled with clip 20g.

The panel retainer 22 may be provided with an elongated horizontal slot 22c and a rearwardly facing edge 22d. Either the slot 22c or the edge 22d may be utilized for carrying an elongated gasket which supports and weatherstrips the panel 12.

In the example shown (FIG. 1a), a gasket 34 is dovetailed to the edge 22d and frictionally engages a front side of the panel 12. The main channel member 20a may have an inturned portion 20j on the upper portion of rear flange 20c which engages a rear side of the panel 12 so that the gasket 34 and the inturned portion 20j in combination support and retain the bottom end of the panel 12.

The mullion member 16b may be provided with front and rear elongated slots 16s and 16t (FIGS. 1a and 3) and front and rear edges 16v and 16w in a manner similar to that described for the panel retainer 22 for retaining and supporting the sides of panels 12 and 14. In the example shown in FIG. 3, an elongated gasket 36 is dovetailed to the edge 16v and frictionally engages the front side of the panel 12 and a gasket 38 is dovetailed within the elongated slot 16t and frictionally engages the rear side of the panel 12. The gaskets 36 and 38 in combination support and retain the vertical end of the panel 12.

The other vertical end (not shown) of the panel 12 and the top end thereof (not shown) may be supported in a similar manner.

Retaining and weather-stripping means may also be provided for the lower panel 14 in a manner similar to that provided for upper panel 12. The panel retainer 24 may thus be provided with an elongated slot 24c and an elongated edge 24d. In the example shown in FIG. 2, a gasket 40 is dovetailed within the slot 24c and frictionally engages the rear side of the panel 14. Another gasket 42 is dovetailed to the inturned panel retaining edge 22a and engages the front side of the panel 14. Accordingly, the gaskets 40 and 42 in combination support the top end of the panel 14.

As shown in FIG. 4 an elongated vertical panel retainer 44 may have a front turned edge 44a, a laterally extending wall 44a' spaced rearwardly from front recess side 16n to provide a space for receiving panel 14, and a laterally spaced, rear looped edge 44b. The front turned edge 44a engages the mullion member 16b within an elongated slot 16x and the looped edge 44b engages the mullion member 16b within the elongated slot 16t so that the panel retainer 44 is easily and releasably connected to the mullion member 16b. The panel retainer 44 may be constructed of a material, such as stainless steel or plastic, so as to allow the looped edge 44b to be snapped within the elongated slot 16t after the retainer edge 44a is in engagement with the mullion member 16b within the elongated recess 16x.

As shown in FIG. 4, an elongated vertical gasket 46 may be dovetailed to an edge 44c of the panel retainer 44 and frictionally engages the rear side of the glass panel 14. Further, an elongated vertical gasket 48 may be dovetailed with the elongated slot 16s and frictionally engages a front side of the panel 14. The gaskets 46 and 48 in combination support the vertically extending end of the panel 14. A glass wall panel 14' (as seen in FIG. 4) may be supported in a similar manner from mullion 16a.

All of the gaskets may be constructed of any suitable material for supporting and weather-stripping the panels such as vinyl, synthetic rubber or even metal. Each of the gaskets may be a single elongated strip.

It is to be noted that the means described for supporting and retaining panels 12 and 14 in members 16 or 18 and 20 eliminate the requirement of notching or coping of the main horizontal channel member 20a or the mullion member 16. Both of these members can be manufactured by ordinary processes and merely cut to length. This simplifies manufacturing of the members in the shop prior to assembly on the job and reduces costs to a minimum.

It is important to note that the main horizontal channel member 20a is received within the channel member recess 16m and that the gasket 36 bridges the thickness of the front flange 20b and extends therebeyond to engage the front side of the panel 12 and that the gasket 38 bridges the inward dimension of the inturned edge 20j to engage the rear side of the panel 12. In a like manner, the gasket 48 bridges the thickness of the front flange 20b and extends therebeyond to engage the front side of the glass wall panel 14 and the gasket 46 in combination with the panel retainer 44 bridge the crosswise dimension of the panel retainer 24 to engage the rear side of the glass wall panel 14. By so dimensioning the gaskets, the mullion 16 does not have to be altered in its cross-section by notching or coping for retaining and weather-stripping panels 12 and 14.

As shown in FIG. 4, a reinforcing member 16c' of a generally I-beam cross-section may be substituted for the reinforcing sheet 16c for separating the mullion members 16a and 16b along the glass wall panel 14.

In prior curtain wall constructions, hollow vertical mullion sections have been joined together by hollow connecting sleeves. It is desirable to provide a space between adjacent vertical mullions to allow for expansion and contraction after the curtain wall is assembled.

As shown in FIGS. 1 and 5, the mullion 16 has a top end 16y which is spaced from a bottom end 18y of the upper mullion so as to allow for expansion of the mullions 16 and 18. A hollow sleeve 50 may snugly engage the interior surfaces defining the hollow spaces 18e and 18f and may bridge the space between the mullions 16 and 18 and extend into the mullion spaces 16e and 16f to snugly engage the inner surfaces therein. The sleeve 50 may be fixedly supported within the hollow spaces 18e and 18f by any suitable means such as welding (not shown) and may be sealed to the interior mullion surface which forms these spaces by any suitable sealing means such as mastic between the sleeve edge and the mullion. The sleeve 50 may slidably engage the mullion 16 within the hollow spaces 16e and 16f. No sealing means are provided between sleeve 50 and lower mullion 16 thereby allowing water to drain downwardly into hollow spaces 16e and 16f.

Accordingly, as the mullions 16 and 18 expand or contact, the sleeve 50 will slide within the mullion 16. Water that may have entered the forward hollow mullion spaces 18e and 18f of mullion 18 will be channeled within the sleeve 50. This water will travel downwardly within the sleeve 50 past the joint between the mullions 16 and 18 so as to present no problem of leakage of this water into the building.

As shown in FIGS. 1, 5 and 6, an elongated U-section sealing element 52 is rigidly connected to the mullion 18 within the mullion recess 18m by any suitable means such as rivets 52a and may be sealed thereto by any suitable means such as mastic. The lower portion of element 52 may slidably engage the walls of the mullion recess 16m. When the mullions 16 and 18 expand or contract, the element 52 will slide with respect to the mullion within mullion recess 16m. Another sealing element is similarly connected to the mullion 18 within mullion recess 18k and is slidable with respect to mullion 16 within mullion recess 16k.

Such sealing elements 52 prevent water leakage into the building from the channel recesses 16k and 16m and 18k and 18m.

The sleeve 50 and sealing elements 52 will prevent a majority of the water from entering into the structure; however, a portion of the water may enter the space between the mullion ends 16y and 18y. This may occur by water entering an opening 54 (FIG. 5) and a similar opening on an opposite side of the mullions and traveling along a rear side of the sleeve 50 until it reaches an area 56 as shown in FIG. 6. After reaching the area 56, the water is free to enter the space between the mullions 18 and 16 which are located rearwardly of area 56. If the water is not stopped, it may seep inside the structure.

The leakage of water along the mullion top end 16y rearwardly of the area 56 has been eliminated by shaping the mullion members 16a and 16b so as to provide the top end of this mullion with a surface 16z (as seen in FIG. 5) which slopes downwardly toward the front of the curtain wall.

The leakage of water along the bottom end 18y of the upper mullion 18 is eliminated by providing the bottom end 18y with a novel shape. As shown in FIG. 5, a portion of the bottom end 18y may be notched at 18y' so as to provide an abrupt change in slope of the bottom end 18y and 18y".

Water that is traveling along the forward horizontal portion of the end 18y will drip from the end 18y upon reaching the abrupt slope change at 18y" and then will drop to the surface 16z and the top of the reinforcing sheet 16c, after which it can drain through the mullion spaces 16e and 16f.

In the example shown in FIG. 5, the notch 18y' provides a change in slope at 18y" of approximately 90°. The degree of change in slope of the bottom end 18y may be less than 90° depending upon the parameters to be considered in the design. Taking into consideration the expected wind forces, the amount of rain and capillary action, the change in slope at 18y" is to be such that water traveling rearwardly along the bottom end 18y will, upon reaching the change in slope at 18y", drip from the bottom end 18y and fall to the spaces therebelow.

The retainer 22 may be provided with a plurality of weep holes, one of these weep holes being shown at 22e in FIG. 2. In a like manner the clip 20e may be provided with a plurality of weep holes, one of the weep holes being shown at 20e' in FIG. 2. These weep holes will drain any water that may become trapped by condensation or otherwise in the retainer 22 or clip 20e vicinities.

As shown in FIGS. 1, 5 and 6, the mullion 18 may be connected to any structure such as a concrete slab 60 by a mullion anchor 62. The mullion anchor 62 may be secured to the concrete slab 60 by any suitable means such as bolts 64 and an insert 66 which is bonded in the slab. The mullion anchor 62 may extend through the rear side of the mullion 18b (FIG. 6) and may be connected to the mullion members 18a and 18b by any suitable means such as rivets 62a.

The bottom end of the reinforcing sheet 18c may bear directly on a top end of the mullion anchor 62 (FIG. 5). The mullion 16 and the other mullions in the curtain wall framing may be supported in a similar manner at each floor slab level of the structure.

The above description of FIGS. 1-7 inclusive includes the subject matter of original application Ser. No. 336,824. FIGS. 8-17 inclusive illustrate a modified curtain wall construction embodying the present invention and FIGS. 18 and 19 illustrate a modified form of releasable connection of the horizontal member to the vertical mullions. In the following description like reference numerals will be used on similar parts but will not relate to the reference numerals used in FIGS. 1-7 inclusive. The following description will emphasize the differences in construction and mode of assembly of the embodiment shown in FIGS. 8-19 as compared to the previous embodiment of the invention.

In FIG. 8, a portion of a structural steel building frame work 100 may support an anchor means 101 provided with an anchored plate 102 connected by suitable means such as rivets or bolts 103 to a vertical mullion column 104. Each mullion column 104 may include a plurality of vertically aligned spaced mullion members 106, each comprising rolled steel mullion segments 107 of similar cross-sectional configuration and symmetrically arranged about a vertical plane bisecting the mullion column 104. Each mullion segment 107 comprises a front mullion portion having a side wall 108, a front wall 109 disposed at an acute angle to its contiguous side wall 108, a front return lip 110, and a recess wall 111, all of which form with the corresponding adjacent mullion segment 107 a front hollow mullion portion. Each mullion segment includes a back portion comprising a vertically extending web 114 rolled integral with recess wall 111 of the front portion, and a back recess wall 115 which forms with web 114 and recess wall 111 a vertically extending mullion recess. A mullion recess opening 116 may be defined by gasket retaining channels 117 formed by opposed rolled parallel channel portions 118 projecting inwardly from the spaced parallel planes of recess walls 111 and 115. Webs 114 are in back-to-back, face-to-face abutment and segments 107 may be secured together to form a mullion member 106 as by welding along webs 114.

Means for coupling or splicing together vertically spaced aligned mullion members 106 while permitting longitudinal expansion and contraction thereof may include a longitudinally split front sleeve member 120 having its bottom end portion sleeved within the hollow front portion of the lower mullion 106 and secured therein as by cementing at 121. The configuration of sleeve 120 corresponds with the internal surface configuration of the hollow mullion front portion as best seen in FIG. 12 and includes a channel 110a for slidably frictionally holding lips 110 together. The upper portion of sleeve 120 extends above the top of lower mullion 106 for sliding reception in the lower front hollow portion of the upper mullion 106 as best seen at 122, FIG. 8.

The mullion coupling means also includes in each mullion recess a generally channel section back sleeve 124 having a configuration similar to the internal surface configuration of the mullion recess as defined by web 114, recess walls 111 and 115, and channel projecting portions 118. Back sleeves 124 may be preassembled with a water-barrier plate 135 for handling as a unit by securing plate 135 in position between sleeves 124 by suitable rivets or spot welding at 137. This mullion coupling unit may be sleeved onto the top portion of a lower mullion with lower sleeve portions receiving therebetween the back-to-back webs 114 until the bottom edge of barrier plate 135 abuts the top edges of webs 114. A nondrying mastic is applied to the bottom edge of plate 135 and up abutment with webs 114, a seal is afforded between these edges. Back sleeves 124 may be secured by suitable means such as rivets or bolts 125 to the upper portion of lower mullion 106 and may project above the top of lower mullion 106 a distance greater than the distance that the front sleeve projects thereabove.

The bottom portion of upper mullion 106 may carry in its mullion recesses sleeve cap means 126 secured thereto as by a common rivet or bolt 127. The top portion of sleeve cap 126 may be of relatively thick section and engages internal surfaces of the mullion recess. Beneath the thick section, sleeve cap 126 is provided with a depending bottom sleeve portion 128 spaced from the internal surfaces of the mullion recess a sufficient distance to slidably receive the top portion of sleeve 124 in telescopic relation therewith as best seen at 129, FIG. 8. Sleeve cap 126 is of generally channel section and its flange 126a adjacent inner recess wall 111 extends to and contacts the gasket-holding channel portion 118. To facilitate the telescopic relation of the cap 126 and sleeve 124, a lip 124a formed on sleeve 124 adjacent wall 111 is relieved or cut out at 124b to receive the lower portion of flange 126a.

When the upper mullion member 106 is lowered into assembly with the lower mullion 106, upwardly extending open-ended rectangular notches or recesses 132 provided in webs 114 receive in spaced relation barrier plate 135. The top edge 134 of plate 135 may carry a sufficient amount of mastic sealant to close in sealed relation web space 133 (FIG. 12) above edge 134.

Each mullion coupling means as above described thus comprises a front sleeve 120 which reinforces, aligns and closes the expansion space between adjacent ends of mullion members 106 at the hollow front portions thereof and a pair of back sleeve means including sleeves 124 and caps 126 which engage internal surfaces of the oppositely facing mullion recesses.

Means for preventing water from traveling from the mullion column 104 along bottom edges of mullion members 106 inwardly of the curtain wall and for directing water and moisture downwardly past each mullion joint without leakage to the back face of the mullion column or the curtain wall includes the notches 132 in webs 114. In this example, it should be noted that notch 132 extends above the bottom edge of depending sleeve portion 128 of sleeve cap means 126 and that in assembly (FIG. 8), top edge 136 of the notch lies below the top edge of back sleeve 124. Barrier plate 135 has a width less than the width of notch 132 and a height such that the top edge of plate 135 will be spaced from the top edge of notch 132 at least equal to the expansion spacing between adjacent mullion ends at the mullion joint.

In the present embodiment it will be apparent that any moisture or water which may collect or drain through the front hollow portion of mullion column 104 will be directed past each mullion joint by front sleeve 120. Water, which may drain along the inner edges 140 (FIG. 12) of front sleeve 120, may reach, collect and move inwardly along bottom edge 141 of upper mullion member 106. When such water reaches right angle 142 formed by notch 132, the change in direction of the metal material will cause water to collect and drop downwardly to the top edge 143 of lower mullion 106 where it will drain outwardly into the front hollow portion of the mullion column because of barrier plate 135 which occupies space 133.

The back sleeve caps 126 and cooperable sleeves 124 are further constructed to provide a positive seal against water leakage at the mullion joint and particularly along mullion recesses. The top outer edge of sleeve cap 126 may be beveled to provide a peripheral recess 138 which may be filled with a suitable caulking or sealant compound or composition of well known sealant material. The interior flange of cap 126 positioned against recess wall 115 includes an inwardly directed return lip 126b which presents a vertical inner edge 126c substantially in the plane of the edges 118a and the coplanar edges 124c of the adjacent lip 124d of sleeve 124. A panel received in the mullion recesses spans a mullion joint, and a gasket strip 200 retained in channel portion 118 has continuous sealing engagement with edge faces 126c of the sleeve cap return lip 126b, edge 124c of lip 124d of sleeve 124, and edges 118a of channel portion 118. Thus, water drainage is diverted by sealant at 138 to the inner surface of cap 126 and passes downwardly to the inner surface of sleeve 124. At the expansion space between the top of sleeve 124 and the shoulder formed by the thick section of sleeve cap 126, water cannot pass along edges of lips 126b, channel portion 118, and edge 124c to drain between the depending sleeve portion and the upper sleeve portion to the mullion joint. Water draining downwardly along internal surfaces of the lower portion of sleeve 124 will continue downwardly along internal surfaces of the walls 114, 115 and the mullion recess until the water encounters sleeve cap 126 of the mullion joint therebelow where it is again diverted in similar manner. Thus, the cooperable engagement of the gasket strip 200 with the sleeve cap, mullion channel portions, and sleeve member prevents water from traveling inwardly of the mullion column at the vicinity of a mullion joint. Weep holes (not shown) are provided at the bottom of each mullion column to drain water outwardly away from the curtain wall.

At spaced vertical intervals along mullion column 104, horizontal members generally indicated at 150 may extend between said columns and be releasably connected therewith for relative movement between the mullion column and horizontal members to allow expansion and contraction of the horizontal member. Each horizontal member 150 may be made of a rolled steel section and may comprise a horizontal web 151 (FIG. 14), a back upstanding flange 152 and a front depending flange 153 provided with an inwardly directed channel-like edge portion 154. The front face of the channel portion 154 may lie in a plane forwardly of the front face of the depending flange 153 to provide a seat at 155 for a longitudinally extending member 156 secured as by rivets 157 to flange 153 at locations spaced below horizontal web 151. The top longitudinally extending portion 158 of member 156 may be of channel section facing inwardly and above web 151.

Horizontal member 150 includes opposite end portions of similar construction for connection to mullion columns 104, only one end portion being described and being best shown in FIGS. 14, 15 and 16. Each end portion of member 150 has its horizontal web 151 and flanges 152, 153 including channel portion 154 received within the opening 116 of the mullion recess. As best seen in FIG. 16, the inner face of flange 152 slidably engages as at 160, edges of projecting channel portions 118. Channel portion 154 has an outer face which slidably engages as at 161, the opposite face of projecting portion 118 of the mullion recess. Such abutting sliding engagement limits front and back movement of horizontal member 150 with respect to mullion columns 104.

Adjacent each end of horizontal member 150 web 151 may be provided with a pair of laterally spaced longitudinally elongated rectangular openings 162 which received therethrough, in assembly, upstanding portions 163 of sildewardly extending arms 164 integrally formed on a support bracket 165 secured as by rivets 166 to vertical web 114 of mullion segment 107. Bracket 165 includes a resilient tab 167 struck out of the body portion of bracket 165 and extending toward the upstanding portions 163. In assembly of horizontal member 150 with mullion column 104, end portions of each horizontal member are inserted by vertical tilting of the horizontal member in the plane of the mullion columns so that the end portions may be received within the mullion recesses. The horizontal member is then moved to a horizontal position and lowered so that upstanding projections 163 are received within openings 162 and the adjacent bottom surface of the web 151 rests upon top edges 168 of arms 164. In this position of horizontal member 150, resilient tab 167 may be urged outwardly over the top adjacent surface of web 151 to restrain the horizontal member from upward movement. The elongated rectangular openings 162 permit relative movement between the mullions and horizontals member caused by expansion and contraction and bottom edge 169 of the resilient tab as well as top edges 168 of arms 164 respectively slidably engage the top and bottom surfaces of web 151.

A caulking or sealant compound 169a may be used to fill and seal space between the ends of flanges 152, 153 and web 151 of the horizontal member 150 and the adjacent mullion surfaces defining the mullion recess. Water passing onto the horizontal member may be dispersed and drained therefrom through openings 162 and through suitably located weep holes (not shown).

A modification of a releasable connection of horizontal member 150 to mullion column 104 is shown in FIGS. 18 and 19. In this instance, like reference numerals with a prime sign will be used to facilitate description of the modification.

In FIG. 18, horizontal member 150' includes a horizontal web 151' of slightly greater width than web 151 so that vertical upstanding flange 152' and the depending front flange 153' may slidably engage surfaces of vertical mullion channel portions 118 which define opening 116 of the mullion recess. Bottom channel portion 154' extends forwardly of flange 153' and into the mullion recess opening and is provided with a notch-like opening 162' having a width sufficient to loosely embrace a channel portion 118 and to permit relative movement of horizontal member 150' with respect to the mullion 104 for expansion and contraction thereof.

In this example, the bracket 165' secured to the web of the mullion within the mullion recess includes spaced parallel outwardly extending arms 164' having top edges 168' for slidably supporting web 151'. Arms 164' are not provided with projections 163. Similarly to bracket 165, bracket 165' includes an outwardly extending resilient tab 167' adapted to slidably engage the top surface of web 151'.

Horizontal member 151' may be provided with a horizontal forwardly extending top portion 170 which overlies the top surface of web 151'.

In assembly of modified horizontal member 150' with a mullion column 104, horizontal member 150' is first tilted forwardly about its horizontal axis, is then inclined in the plane of the columns so as to permit ends of the horizontal member to be received within opposed mullion recesses and is then moved to a horizontal position and rotated about its horizontal axis so that the notch-like openings 162' receive therewith a portion of channel 118 on the mullion. The horizontal member may then be lowered until web 151' rests upon arms 164' and resilient tab 167' is urged outwardly to restrain the horizontal web from upward movement. It will be apparent that in such position the horizontal member is limited in front and rear movement by the flanges 152', 153' engaged with mullion channel portions 118, vertical movement is prevented or limited by arms 164' and resilient tab 167' and relative horizontal movement of the member 150' with respect to the mullion is permitted by the notch-like opening 162'.

In both modifications of the releasable connection of horizontal member 150, 150' to the mullion column, it should be noted that the horizontal member is provided with means providing an opening for engagement with a projecting portion carried by the mullion, that is ether upstanding portions 163 or the projecting portion formed by channel 118.

Each of the horizontal members 150, 150' include a similar cross-section shaped front curtain wall panel retainer member 172 having a front wall 173 extending horizontally between side faces 108 of adjacent mullion columns 104 and forwardly of the mullion recess opening. A bottom horizontal inwardly extending hook-like flange 174 is adapted to engage as at 175 the edge portion of channel 154 or 154'. A top flange 176 extends inwardly and is provided with a depending longitudinally extending portion 177 provided with a gasket mounting channel-like configuration 178 and a depending inwardly bent lip 179 to facilitate snapping or clipping retaining member 172 to top portion 158 of the horizontal member 156. As best seen in FIG. 16, retainer member 172 is readily assembled by forwardly inclining the member about a horizontal axis so as to first engage hook portion 175 with channel 154 or 154' and then to pivot the retainer member about such engagement to snap the depending portion 177 over the top flange of wall 156.

Means for retaining member 172 in snug engagement with horizontal member 150 includes spring means 180 carried by wall 156 and having a hook portion 181 engaged with the top flange of wall 156 and a depending front leg 182 in pressure engagement with the inner surface of member 172.

In the embodiment shown in FIG. 19, spring means 180' may be secured by a stud rivet 183 to depending front flange 153', said spring means 180' having a forwardly extending pressure leg 182' in engagement with the front wall 173 of retainer member 172 to hold the member in snug assembled engagement with the horizontal member.

In the present modification of the invention, a back retainer member 190 of generally U-section may be employed for pressure mounting a panel along the bottom of a horizontal member 150. Retainer member 190 includes a back wall 191 having a forwardly and upwardly turned longitudinally extending C-section edge portion 192 for cooperable engagement with a depending and slightly forwardly extending rolled bead 193 formed on horizontal member 150 at the juncture of horizontal web 151 and upstanding rear flange 152. A bottom wall 194 may be joined with a front wall 195 by a channel section configuration 196 to provide suitable mounting means for a panel gasket. Front wall 195 includes a forwardly extending longitudinal portion 197 adapted to be positioned between the top of stud rivet 183 and the bottom surface of web 151 to provide a positioning means for back retainer member 190.

In assembly, retainer member 190 is positioned with respect to horizontal member 150 by stud 183 and flange 197 and is then pressed upwardly to engage the C-section longitudinal section 192 with the depending bead 193. It will thus be apparent that the resiliency of metal retainer member 190 provides a forwardly directed pressure against a curtain wall panel.

Curtain wall panels are retained in the framing provided by the mullion columns and horizontal members along vertical edges by suitable gaskets 200 and 201 mounted in the channel portions 118 of the mullion recesses. The bottom edge of a panel 202 of relatively thick section may be retained by the horizontal member by a back gasket 203 carried by upstanding flange 160 and a front gasket 204 held in place by the front retainer member 172. In the present example in FIG. 16, a glass panel 206 has its top edge retained by a front gasket 207 carried by the channel portion of the depending front flange 153 and a back gasket 208 carried by the back retainer member 190 as described above.

In the embodiments of the invention shown in FIGS. 8-19 inclusive, it will be readily apparent to those skilled in the art that an advantageous way of assembling aligned mullion members with an effective water barrier has been shown and described, alignment of such assembly being facilitated by the fixed front sleeve 122 of relatively short height and the back channel sleeves of relatively great height as compared to the front sleeve. The preassembled back sleeve unit with water-barrier plate 135 is readily assembled and secured to the upper portion of lower mullion member 106 and sleeve cap means 126 in each mullion recess further aligns and reinforces the mullion coupling. It is particularly important to note that the sleeves 124 and sleeve cap means 126 cooperate with channel portions 118 and the gasket strip held thereby to provide a sealed coupling joint at expansion spaces between mullion ends and sleeves 124 and sleeve cap means 126 and which prevents water from reaching the back surfaces of the mullion members 106 and inside the curtain wall.

It should also be noted that in the present invention the releasable connection between the horizontal member and the mullion column does not require field placement of a pin to restrain vertical movement of the horizontal member. Instead, the mounting brackets 165, 165' provide a support and a vertical restraining means which may be mounted on the mullion column at the factory. Thus, an advantageous method of assembling horizontal members with mullion columns is provided whereby the horizontal members are limited in movement in any direction and are connected to the mullion columns without use of auxiliary tools.

I claim:
1. In a curtain wall construction the combination of:
  a plurality of mullion columns in laterally spaced relation and comprising vertically aligned spaced mullion members;
  a plurality of horizontal members in vertically spaced relation interconnected with said columns for supporting curtain wall panels;
  each mullion column comprising a front portion and a back portion;
  said back portion including vertical mullion webs in face to face abutment and sidewardly extending mullion recess walls defining oppositely facing mullion recesses;
  an upwardly extending opening in said mullion webs at the bottom portion of each mullion member;
  sleeve means in said mullion recesses, including a sleeve member extending from a lower mullion member above said web opening in the upper mullion member;
  a sleeve cap means carried in the lower portion of the upper mullion recess for telescopic reception within said sleeve member of the lower mullion member;
  sealing means between said sleeve member, said sleeve cap means, and said mullion recess walls and having sealing portions extending vertically across expansion spaces between said mullion members and said sleeve members and sleeve cap means;
  a barrier plate carried by said sleeve member of the lower mullion member at the top of each mullion member and extending into said web opening in spaced relation to edges of said opening;
  whereby a water barrier for the front mullion portion is formed by said barrier plate and water diverting means is formed by said sleeve means in said recesses for preventing water from flowing toward the interior side of the mullion column; and
  means carried by said mullion webs for releasably interconnecting ends of said horizontal members with said mullion column.

2. A curtain wall construction as stated in claim 1 including vertically split sleeve means in said front portion of each mullion column, said split sleeve means being secured to the upper end of the lower mullion member and extending into the lower portion of the upper mullion member.

3. A curtain wall construction as stated in claim 2 wherein said sleeve means in said mullion recesses extend upwardly above the split sleeve means in the front portion of said mullion members.

4. A curtain wall construction as stated in claim 1 wherein said means releasably interconnecting said horizontal members with said mullion column include:
  a connecting member secured to a mullion web within said mullion recess;
  said connecting member having support and interlocking means;
  and said horizontal member including means to engage said interlocking means on said connecting member.

5. In a curtain wall construction as stated in claim 1 wherein said means for releasably interconnecting said horizontal members with said mullion column include:
  means projecting from one of the walls of said mullion recess;
  and means on said horizontal member interengaging with said projecting means for limiting relative movement between said horizontal member and mullion member in a horizontal direction.

6. A curtain wall construction as stated in claim 5 wherein said projecting means includes surfaces for supporting the adjacent end of said horizontal member.

7. In a curtain wall construction as stated in claim 6 wherein said releasable interconnecting means includes an outwardly biased tab carried by said mullion web.

References Cited

UNITED STATES PATENTS

| | | | |
|---|---|---|---|
| 3,266,210 | 8/1966 | Grossman | 52—235 |
| 3,357,145 | 12/1967 | Grossman | 52—235 |

FOREIGN PATENTS

| | | |
|---|---|---|
| 1,264,130 | 5/1961 | France. |
| 1,271,188 | 7/1961 | France. |
| 1,408,895 | 7/1965 | France. |

HENRY C. SUTHERLAND, *Primary Examiner.*

U.S. Cl. X.R.

52—573, 665, 726